US010375204B2

(12) United States Patent
Quintero

(10) Patent No.: US 10,375,204 B2
(45) Date of Patent: Aug. 6, 2019

(54) EXTRACTION OF DOMINANT CONTENT FOR LINK LIST

(71) Applicant: Microsoft Technology Licensing, LLC, Redmond, WA (US)

(72) Inventor: Megan Marie Quintero, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 471 days.

(21) Appl. No.: 15/149,077

(22) Filed: May 6, 2016

(65) Prior Publication Data

US 2017/0324837 A1 Nov. 9, 2017

(51) Int. Cl.

*G06F 15/16* (2006.01)
*H04L 29/08* (2006.01)
*G06F 16/955* (2019.01)

(52) U.S. Cl.

CPC ........ *H04L 67/327* (2013.01); *G06F 16/9562* (2019.01); *H04L 67/02* (2013.01); *H04L 67/22* (2013.01); *H04L 67/303* (2013.01)

(58) Field of Classification Search

CPC ........................................................ H04L 67/22
USPC ........................................................ 709/226
See application file for complete search history.

(56) References Cited

U.S. PATENT DOCUMENTS 7,325,202 B2 1/2008 Shirriff
9,037,975 B1 5/2015 Taylor et al.
2005/0166138 A1* 7/2005 Kundu ................ G06F 17/3089 715/206
2006/0059225 A1 3/2006 Stonehocker et al.
2008/0195664 A1 8/2008 Maharajh et al.
2010/0088332 A1 4/2010 Nussel et al.
2010/0131455 A1 5/2010 Logan et al.
2012/0059825 A1 3/2012 Fishman et al.
2012/0095834 A1* 4/2012 Doig ................ G06F 17/30867 705/14.53
2012/0179955 A1* 7/2012 French .............. G06F 17/30899 715/207
2012/0266090 A1 10/2012 Nealer et al.
2013/0007596 A1 1/2013 Vandermolen et al.
2014/0372563 A1 12/2014 Ke et al.
2015/0113548 A1 4/2015 Stern et al.
(Continued)

FOREIGN PATENT DOCUMENTS

WO 2013083048 A1 6/2013

OTHER PUBLICATIONS

Fylan, Joe, "Display Your Best Content with the WordPress Popular Posts Widget", Available at: <<https://pagely.com/blog/2015/03/display-best-content-wordpress-popular-posts-widget/>>, Mar. 31, 2015, pp. 3.

*Primary Examiner* — Hamza N Algibhah
(74) *Attorney, Agent, or Firm* — Arent Fox, LLP

(57) ABSTRACT

In one example, a user device may implement a browser that identifies and presents dominant content in a bookmarked website or a frequently visited website. The user device may store a page history profile describing interactions with a featured hub of content. The user device may execute a browser to identify a historical focus describing a historical hub element of the featured hub. The user device may determine a current hub element acting as a current focus specific for a user based on the historical focus. The user device may present an element representation of the current hub element.

20 Claims, 15 Drawing Sheets

600

(56) References Cited

U.S. PATENT DOCUMENTS

| | | | | |
|---|---|---|---|---|
| 2016/0103913 | A1* | 4/2016 | Jacob | H04L 67/1097 707/709 |
| 2016/0261701 | A1* | 9/2016 | Dhawan | H04L 67/22 |
| 2017/0078414 | A1* | 3/2017 | Arulesan | H04L 67/22 |
| 2017/0153702 | A1* | 6/2017 | Abrahams | G06F 3/016 |
| 2018/0060749 | A1* | 3/2018 | Yan | G06N 7/005 |
| 2018/0068347 | A1* | 3/2018 | Fernandes | G06F 17/30902 |
| 2018/0191698 | A1* | 7/2018 | Kundu | H04L 63/08 |

* cited by examiner

100

200

300

400

500

600

700

800

900

| WEBSITE ID 1010 | USER ID 1020 | DEVICE ID 1030 | HUB HIT COUNT 1040 | SELECTED ELEMENT 1050 | | IMPLIED ELEMENT 1052 | |
|---|---|---|---|---|---|---|---|
| | | | | SPOKE 1060 | COUNT 1062 | FREQ 1064 | RECENT 1066 |
| | | | | CAT 1070 | COUNT 1072 | FREQ 1074 | RECENT 1076 |

EXTRACTION OF DOMINANT CONTENT FOR LINK LIST

BACKGROUND

Previously, a user could use a browser to maintain a bookmark listing storing a set of bookmarks representing preferred webpages or websites for a user. A website is a grouping of one or more webpages under a single domain. The user may identify a webpage when browsing the webpage as a favorite webpage. The browser may then store a link or uniform resource locator to the webpage as a bookmark. The user may then present the bookmarks in a list grouped according to a user criteria. Upon opening a new tab page in the browser, the new tab page may present a set of icons representing the bookmarks for selection by a user.

Alternately, the browser may track the webpages that a user accesses. The browser may mark a group of webpages as frequently visited websites of the user. The browser may have a predetermined number as the size of the frequently visited websites. Alternately and additionally, the browser may have a minimum number of visits to qualify a website as a frequently visited website.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate implementing a browser that identifies and presents dominant content in a bookmarked website or a frequently visited website. The user device may store a page history profile describing interactions with a featured hub of content. The user device may execute a browser to identify a historical focus describing a historical hub element of the featured hub. The user device may determine a current hub element acting as a current focus specific for a user based on the historical focus. The user device may present an element representation of the current hub element.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 10 illustrates, in a block diagram, one example of a hub record.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a user device, a computing device, or a machine-implemented method.

In one example, a user device may implement a browser that identifies and presents dominant content in a bookmarked website or a frequently visited website. The user device may store a page history profile describing interactions with a featured hub of content. The user device may execute a browser to identify a historical focus describing a historical hub element of the featured hub. The user device may determine a current hub element acting as a current focus specific for a user based on the historical focus. The user device may present an element representation of the current hub element.

A browser may feature a website identified as important to a user. For example, a website may be frequently visited by the user or bookmarked by the user as a favorite website. The website may act as a hub for the user, providing access to content from a variety of webpages or sources. The browser may identify dominant content in the featured website and present the dominant content in a bookmark listing or a new tab page. By moving the selection of the dominant content to the browser from the website, the browser may perform this feature across any website without depending on the functionality of the website.

For any featured website, the browser may detect and identify prominently displayed content of the page for presentation. For example, if a user has bookmarked cnn.com, the browser may dynamically display the top content from within the bookmark listing. Thus the user may avoid navigating to the website to find content of interest.

Additionally, for a featured website that links to other webpages that are frequently navigated to from that web site, the bookmark listing or new tab page may prominently display these links. For example, a student may log into a school portal and navigates to a dining hall menu, official transcript, course selection tool, or a campus map. The browser may display frequently visited links along with the featured website.

Figure 1:
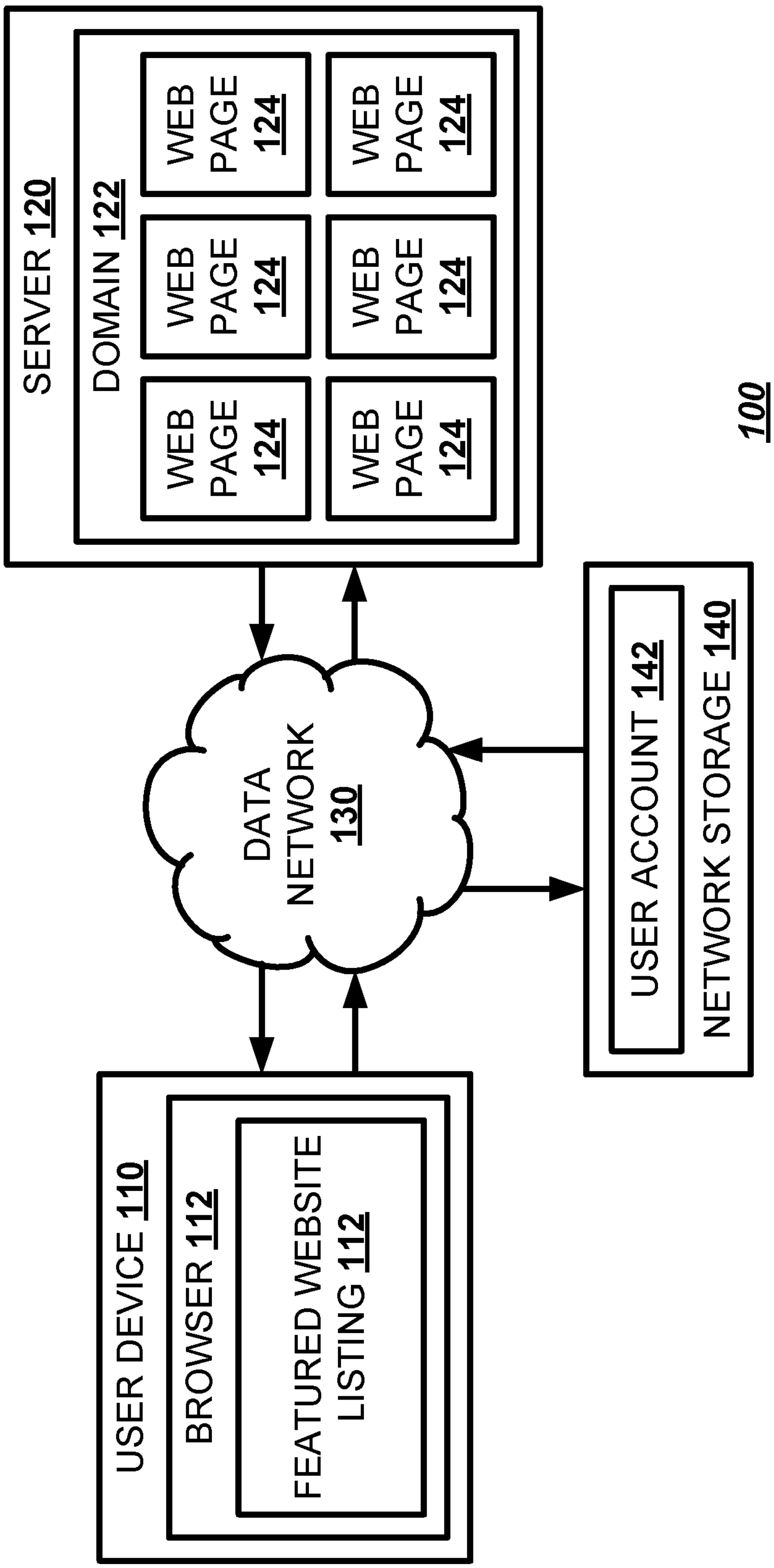
FIG. 1 illustrates, in a block diagram, one example of a data network.

FIG. 1 illustrates, in a block diagram, one example of a data network 100. A user device 110 may implement a browser 112, or similar communication application, to access a website server 120 via a data network connection 130. The website server 120 may present a domain 122 to the user. A domain 122 is an autonomous group of linked webpages 124, such as Macys.com or warnerbros.com. A webpage 124 is a discrete set of hypertext data that may be visually presented to a user. The domain 122 may act as a hub for the user, representing a central location from which the user may travel to various webpages 124 along a variety of link paths. These link paths may radiate from the domain 122 like spokes radiating from a hub. The website server 120 may be implemented on a single server or a distributed set of servers, such as a server farm. The data network connection 130 may be an Internet connection, a wide area network connection, a local area network connection, or other type of data network connections.

The user device 110 may receive an indication from the user marking the hub 124 as a favorite website. The browser 112 may represent the website with a bookmark in a bookmark listing, such as with a hyperlink or a uniform resource locator. The bookmark listing may describe one or more webpages the user accesses on a regular basis. Alternately, the browser 112 may track a hit count for a website by a particular user to determine a frequently visited website group. The browser 112 may store the featured websites as a bookmarked website or a frequently visited website in a network storage 140 under a user account 142 associated with a user of the user device 110. A different user device associated with the same user account 142 may then implement a browser to download an instance of the featured website listing. Thus, the user may synchronize the featured website listing across multiple user devices.

Figure 2:
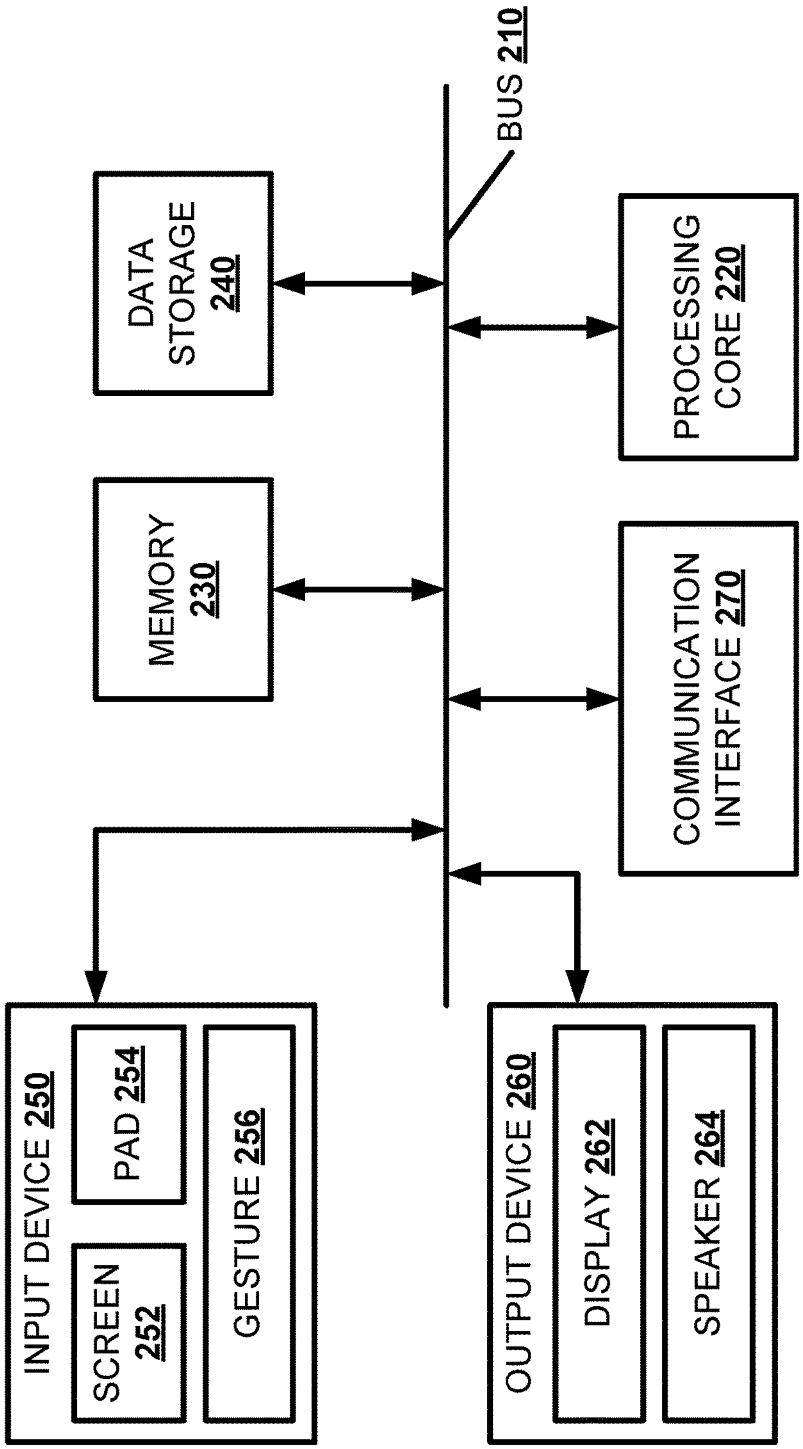
FIG. 2 illustrates, in a block diagram, one example of a computing device.

FIG. 2 illustrates a block diagram of an exemplary computing device 200 which may act as user device. The computing device 200 may combine one or more of hardware, software, firmware, and system-on-a-chip technology to implement user device. The computing device 200 may include a bus 210, a processor 220, a memory 230, a data storage 240, an input device 250, an output device 260, and a communication interface 270. The bus 210, or other component interconnection, may permit communication among the components of the computing device 200.

The processing core 220 may include at least one conventional processor or microprocessor that interprets and executes a set of instructions. The processing core 220 may execute a browser to identify a historical focus describing a historical hub element of a featured hub of content. The processing core 220 may determine a current hub element acting as a current focus specific for a user based on the historical focus. The processing core 220 may identify at least one of a bookmarked website and a frequently visited website as the featured hub. The processing core 220 may identify a link as the historical focus based on a spoke path relation between the featured hub and the link. Similarly, the webpage represented by the link may act as a hub for a set of further satellite webpages. The processing core 220 may identify a category type for the historical focus. The processing core 220 may select the current focus for the featured hub based on a category type for the historical focus. The processing core 220 may generate a content preview of the current hub element to allow the user to efficiently determine whether the content is relevant to the user.

The memory 230 may be a random access memory (RAM) or another type of dynamic data storage that stores information and instructions for execution by the processor 220. The memory 230 may also store temporary variables or other intermediate information used during execution of instructions by the processor 220. The memory 230 may be configured to store a series of instructions that are executed by at least one processor to implement a browser. The memory 230 may store a page history profile describing interactions with a featured hub of content. The memory 230 may track a device-page history profile describing interactions between multiple users on the user device and the featured hub. The memory 230 may maintain a user-page history profile describing interactions between a user and the featured hub. The memory 230 may maintain a spoke path relation between the featured hub and a webpage connected to the featured hub. The memory 230 may associate a category type tag with the featured hub describing a category type for the historical focus.

The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing a hub record.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. The input device 250 may receive a user indication that the current hub element is the current focus. The input device 250 may register a highlight of a text element as indicating the historical focus.

The output device 260 may include one or more conventional mechanisms that output information to the user, including a display screen 262, a printer, one or more speakers 264, a headset, a vibrator, or a medium, such as a memory, or a magnetic or optical disk and a corresponding disk drive. The display screen 262 may present a featured link for the featured hub in at least one of a new tab page and a bookmark listing. The display screen 262 may present an element representation of the current hub element. The display screen 262 may present a content preview of the current hub element.

The communication interface 270 may include any transceiver-like mechanism that enables computing device 200 to communicate with other devices or networks. The communication interface 270 may include a network interface or a transceiver interface. The communication interface 270 may be a wireless, wired, or optical interface. The communication interface 270 may receive a user-page history profile describing interactions between a user and the featured hub from a network account.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
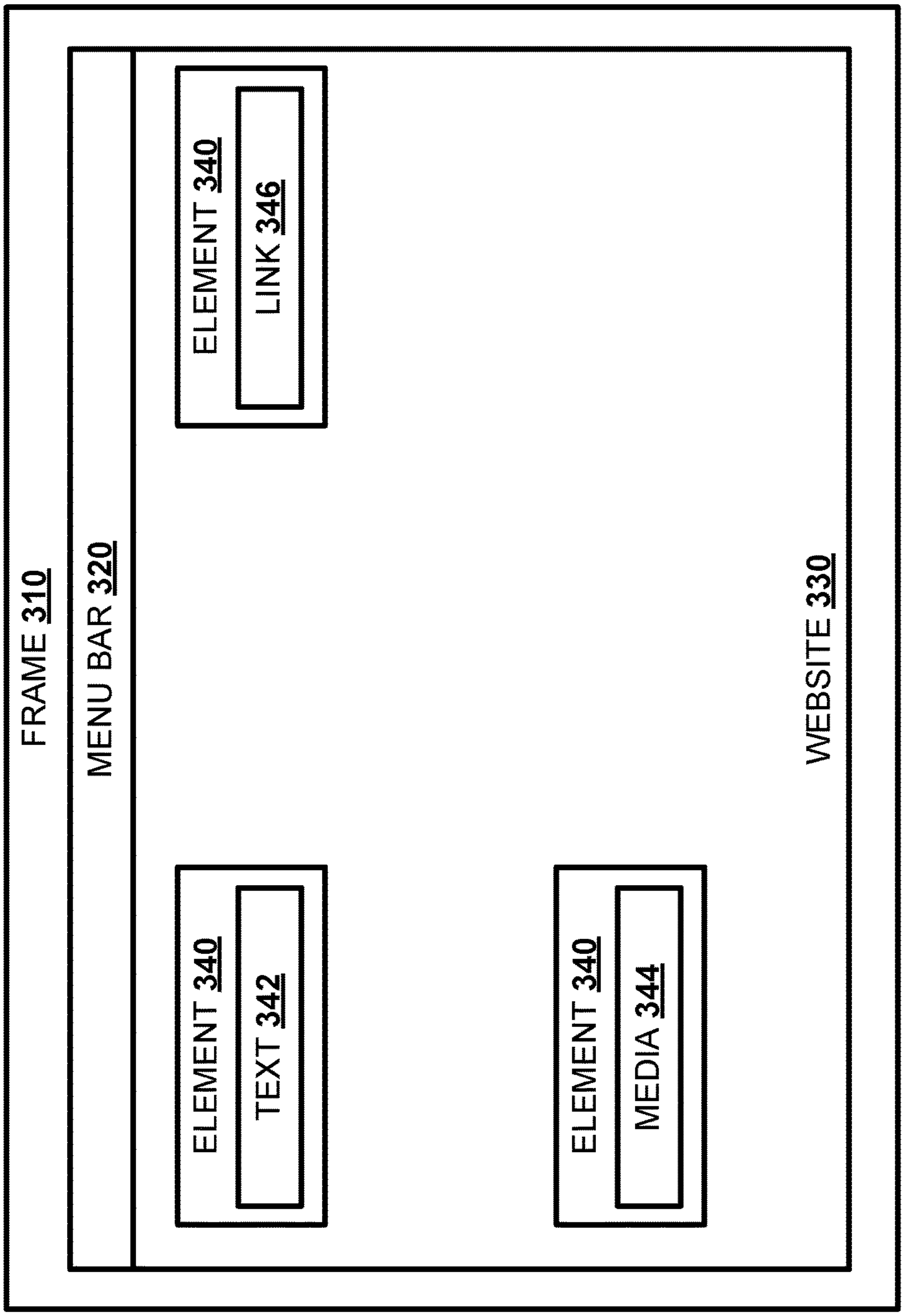
FIG. 3 illustrates, in a block diagram, one example of a hub as presented to a user.

FIG. 3 illustrates, in a block diagram, one example of a hub 300 as presented by a browser to a user. The browser interface 300 may have a frame 310 containing the user interface. The frame 310 may have a menu bar 320 providing controls for operating the browser module. The menu bar 320 may be hidden when not in use or may be present the entire time the browser module is active. The browser may present a web site 330 acting as a hub to a user.

The website 330 may have one or more hub elements 340, representing aspects of the website. A hub element 340 may be non-interactive with a user viewing the website 330, such as one or more lines of updateable text 342. The hub element 340 may be a localized interactive element viewed by a user on the web site 330 without moving the user from the web site 330, such as a media item 344. The hub element 340 may be a pathway to a different webpage, such as a link 346.

Figure 4:
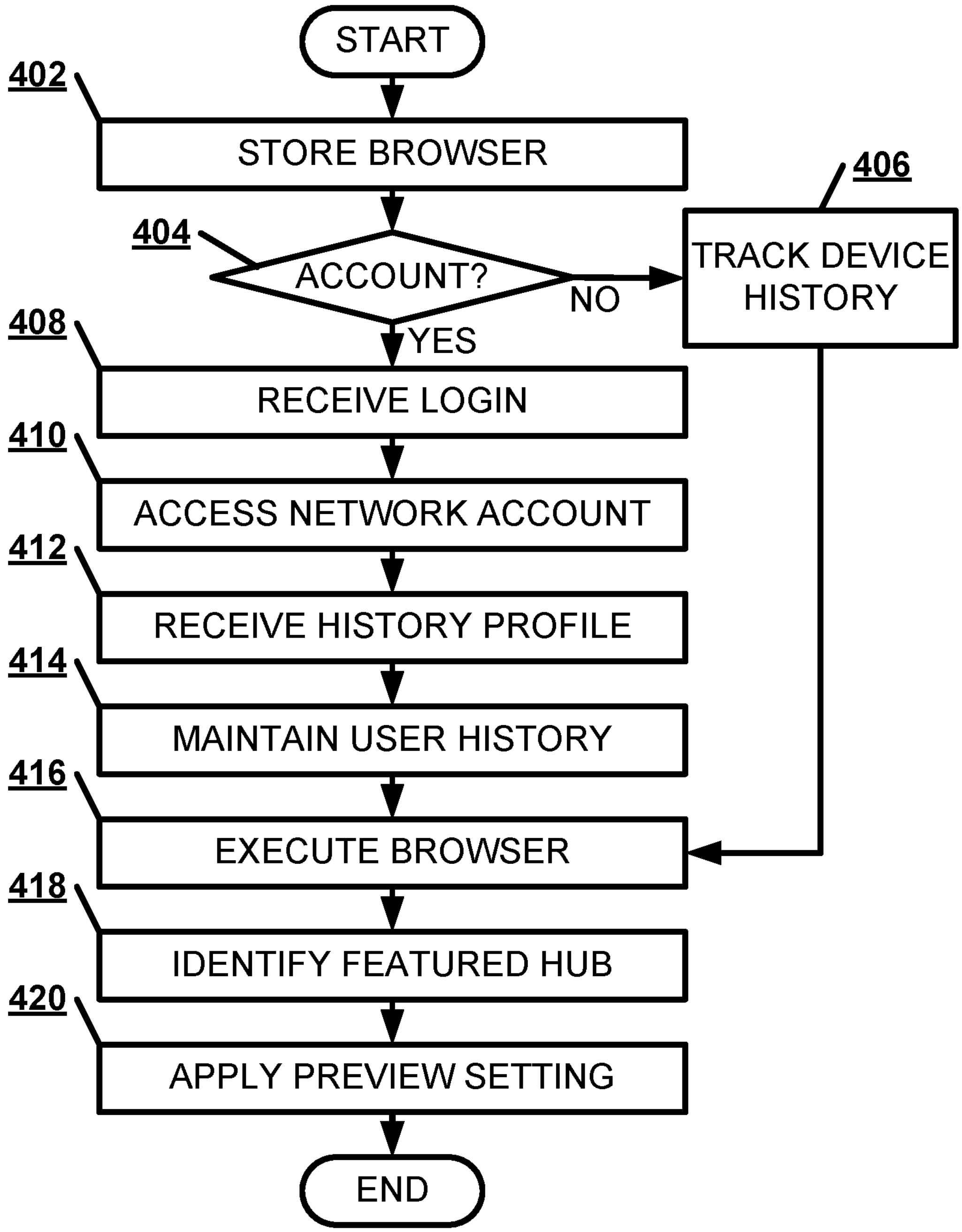
FIG. 4 illustrates, in a flowchart, one example of a method for implementing a browser.

FIG. 4 illustrates, in a flowchart, one example of a method 400 for implementing a browser. A computing device, such as a user device, may store a series of instructions that are executed by at least one processor to implement a browser (Block 402). If the user device is not associated with a network account (Block 404), the user device may track a device-page history profile describing interactions between multiple users on the user device and the featured hub (Block 406). Otherwise or additionally, the user device, via the browser upon activation or the operating system, may receive login information from the user to access a network account for the user (Block 408). The user device may access the network account for the user (Block 410). The user device may receive a user-page history profile describing interactions between a user and the featured website from the network account (Block 412). The user device may maintain the user-page history profile describing interactions between a user and the featured website (Block 414). The user device may execute the browser (Block 416). The browser may identify a featured hub of content for the user based on the user-page history profile or the device-page history profile (Block 418). The browser may apply a preview setting to the featured hubs, determining whether to preview current focuses of those featured hubs (Block 420).

Figure 5:
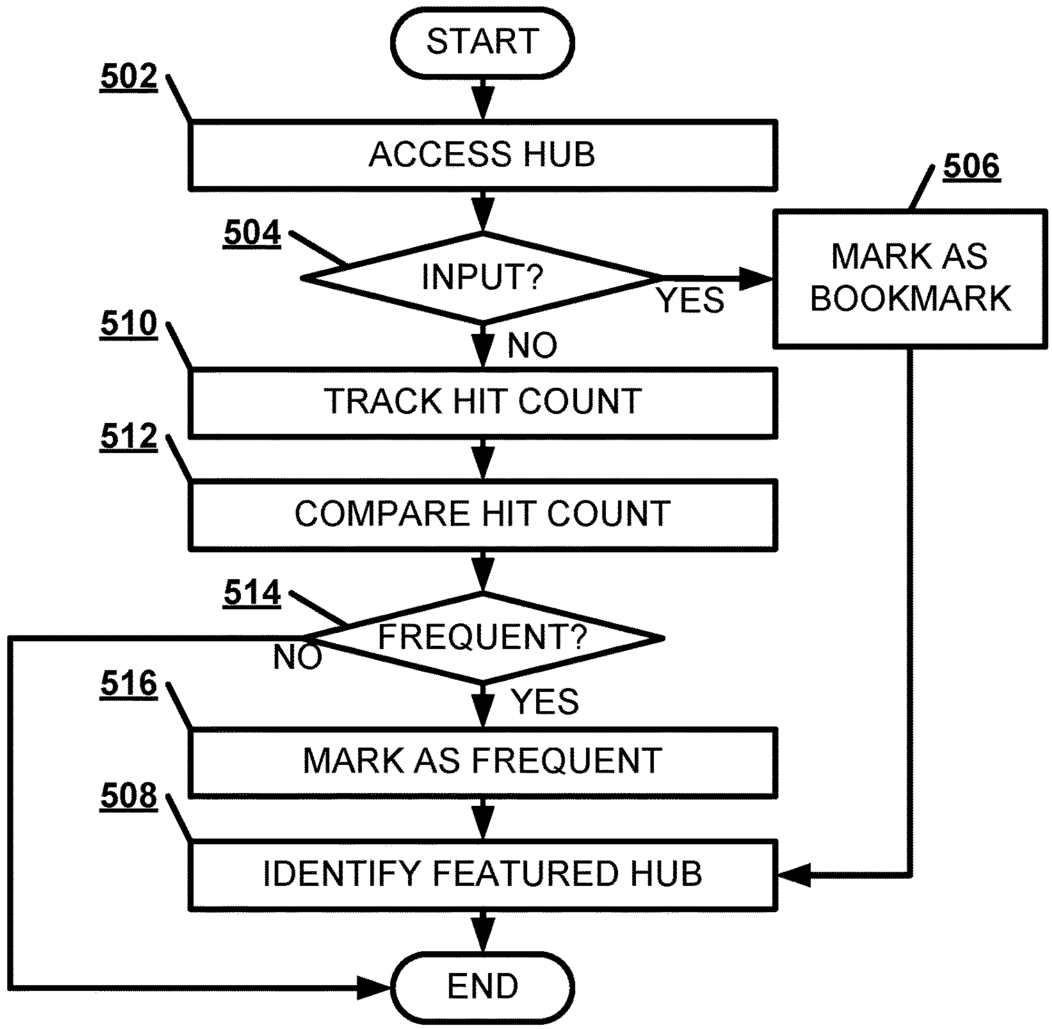
FIG. 5 illustrates, in a flowchart, one example of a method for identifying a featured hub.

FIG. 5 illustrates, in a flowchart, one example of a method 500 for identifying a featured hub. A browser executed by a computing device, such as a user device, may access a website acting as a hub of content (Block 502). If the browser receives a user input indicating the browser is to bookmark the website (Block 504), the browser may mark the website as a bookmarked website (Block 506). The browser may identify the bookmarked website as a featured hub of content (Block 508).

Otherwise, the browser may track a hit count for the website to count the number of times the user or the device accesses the website (Block 510). The browser may compare the hit count for the website to a frequency threshold or to the hit counts for other websites (Block 512). If the comparison indicates the bookmark is frequently visited by the user or the device (Block 514), the browser may mark the website as a frequently visited website (Block 516). The browser may identify the frequently visited website as a featured hub (Block 508).

Figure 6:
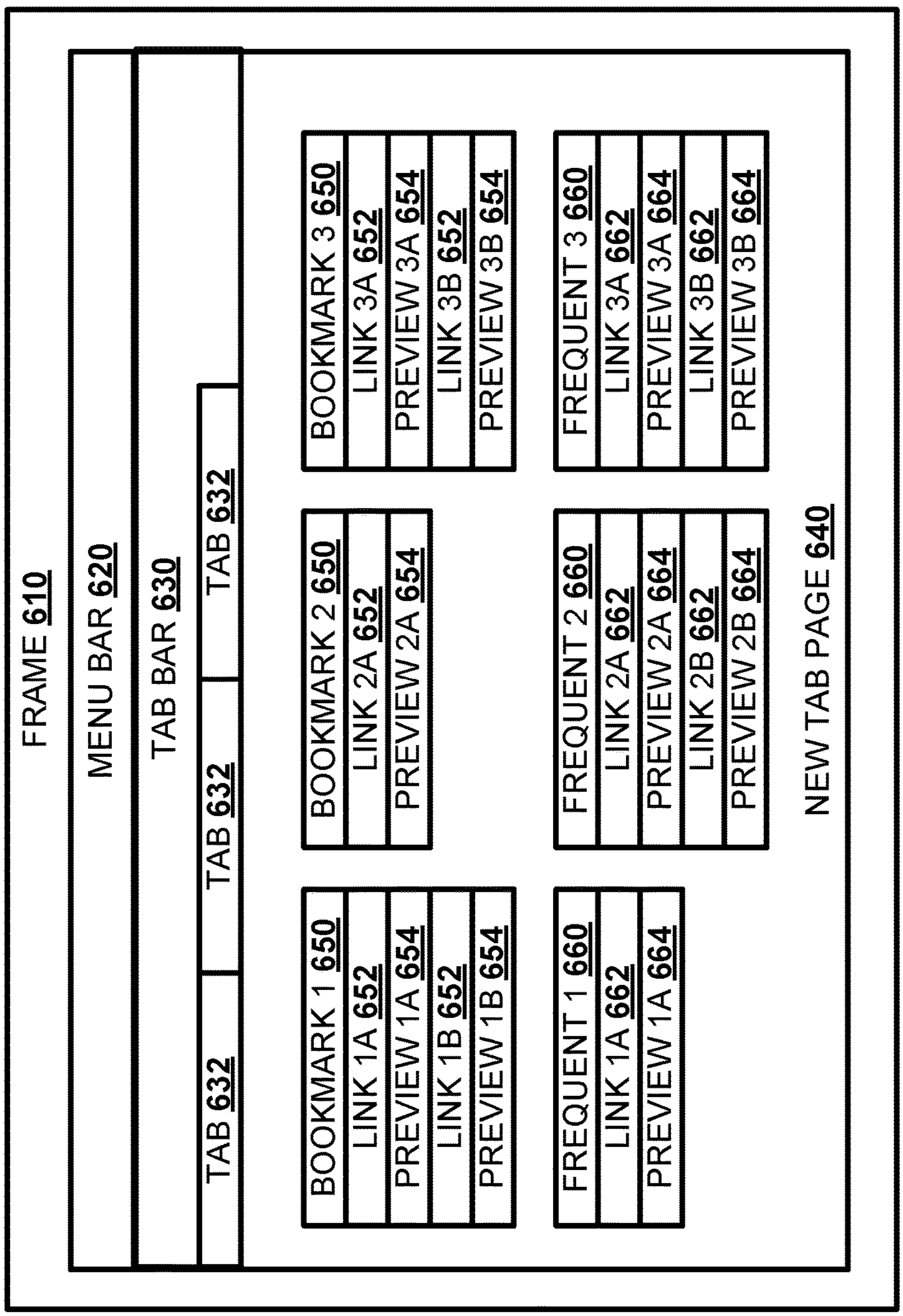
FIG. 6 illustrates, in a block diagram, one example of a user view of a new tab page.

FIG. 6 illustrates, in a block diagram, one example of a user view 600 of a new tab page for a browser interface. The browser interface may have a frame 610 containing the user interface. The frame 610 may have a menu bar 620 providing controls for operating the browser. The menu bar 620 may be hidden when not in use or may be present the entire time the browser module is active. The browser module may have a tab bar 630 presenting one or more tabs 632. Each tab 632 may represent a web page. Upon selection of the tab 632 by the user, the browser module may present the associated web page to the user.

Upon creation of a new tab 632, the browser may present a new tab page 640. For an initial use, the new tab page 640 may be blank. Alternately, the new tab page may present one or more featured hubs to the user to facilitate the user selecting a starting point for browsing. For each featured hub, the browser may identify a historical focus describing a historical hub element of the featured hub website of previous interest to the user. The browser may use the historical focus to determine a current hub element of the featured hub likely to be of interest to the user. The browser may then present an element representation of the current hub element to the user.

For example, the featured hub may be a bookmarked website representing a website selected by the user. The browser may present a featured link acting as a bookmark 650 for the bookmarked website. The browser may identify a link 652 on the bookmarked website leading to a webpage frequently accessed by the user from the bookmarked website as a current hub element acting as a current focus for the user. The browser may present the link 652 as an element representation to the user. The browser may generate a content preview 654 for the webpage represented by the link 652. The browser may present the content preview 654 to the user.

Alternately, the user may identify a set of updateable content on the bookmarked website as a historical focus, either explicitly or by playing if media. The browser may identify the updateable content as a current hub element. The browser may generate a content preview 654 to act as the element representation. The browser may present the content preview 654 to the user.

Additionally, the featured hub may be a frequently visited website 660 of the user. The browser may present a featured link representing the frequently visited website 660. The browser may identify a link 662 on the frequently visited website 660 leading to a webpage frequently accessed by the user from the frequently visited website 660 as a current hub element acting as a current focus for the user. The browser may present the link 662 as an element representation to the user. The browser may generate a content preview 664 for the webpage represented by the link 662. The browser may present the content preview 664 to the user.

Alternately, the user may identify a set of updateable content on the frequently visited website 660 as a historical focus, either explicitly or by playing if media. The browser may identify the updateable content as a current hub element. The browser may generate a content preview 664 to act as the element representation. The browser may present the content preview 664 to the user.

Figure 7:
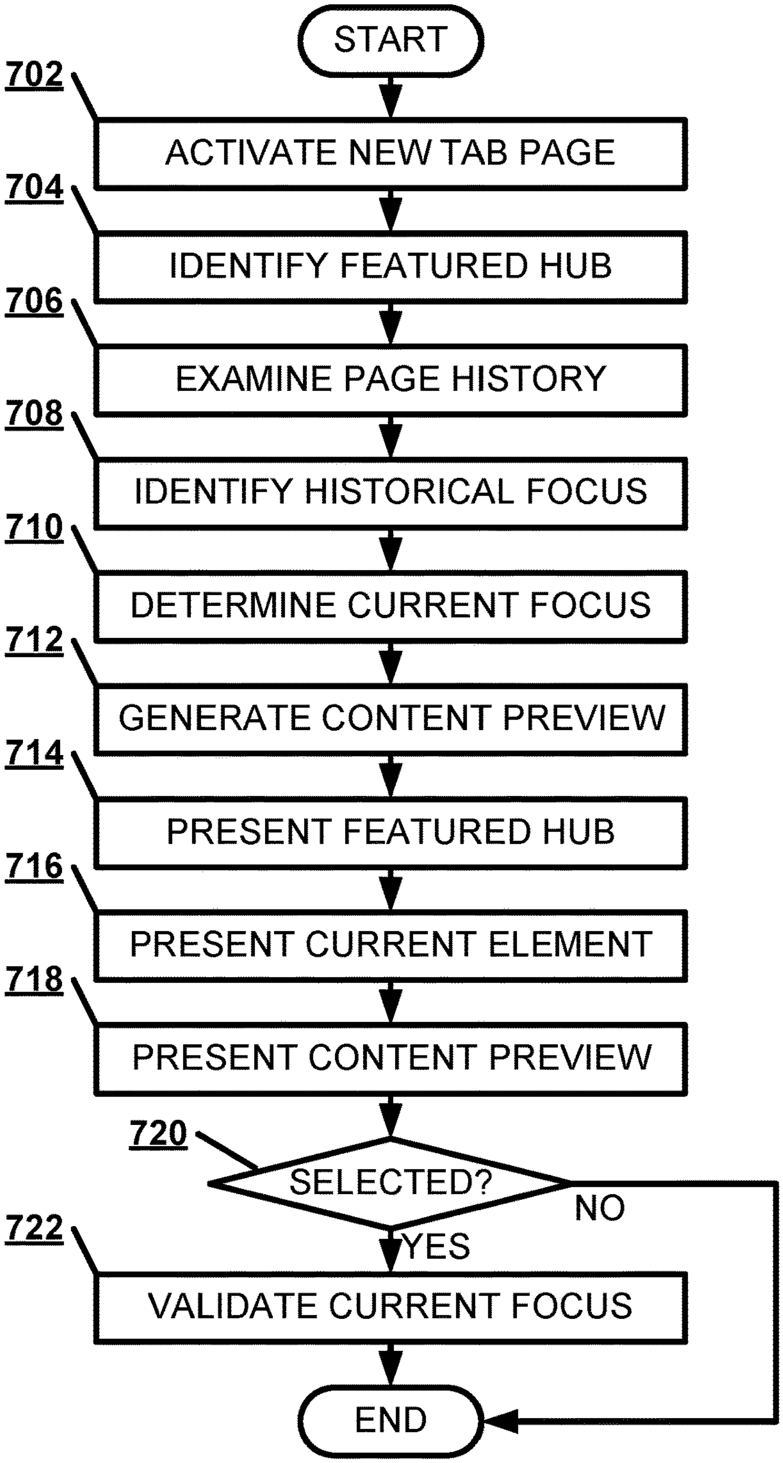
FIG. 7 illustrates, in a flowchart, one example of a method for presenting a frequently visited website.

FIG. 7 illustrates, in a flowchart, one example of a method 700 for presenting a frequently visited website. A browser executed by a computing device, such as a user device, may activate a new tab page upon a user activating a new tab (Block 702). The browser may identify a featured hub of content for the user for the new tab page (Block 704). The browser may examine a page history profile describing interactions with the featured hub (Block 706). The browser may identify a historical focus describing a historical hub element of the featured hub (Block 708). The browser may determine a current hub element acting as a current focus specific for a user of the computing device based on the historical focus (Block 710). The browser may generate a content preview of the current hub element (Block 712). The browser may present a featured link for the featured hub in a new tab page (Block 714). The browser may present an element representation of the current hub element in a new tab page (Block 716). The browser may present the content preview of the current hub element in a new tab page (Block 718). If the browser receives a selection of the element representation acting as a user indication the current hub element is the current focus (Block 720), the browser may validate that the current focus determination was correct and weight future decisions accordingly (Block 722).

Figure 8:
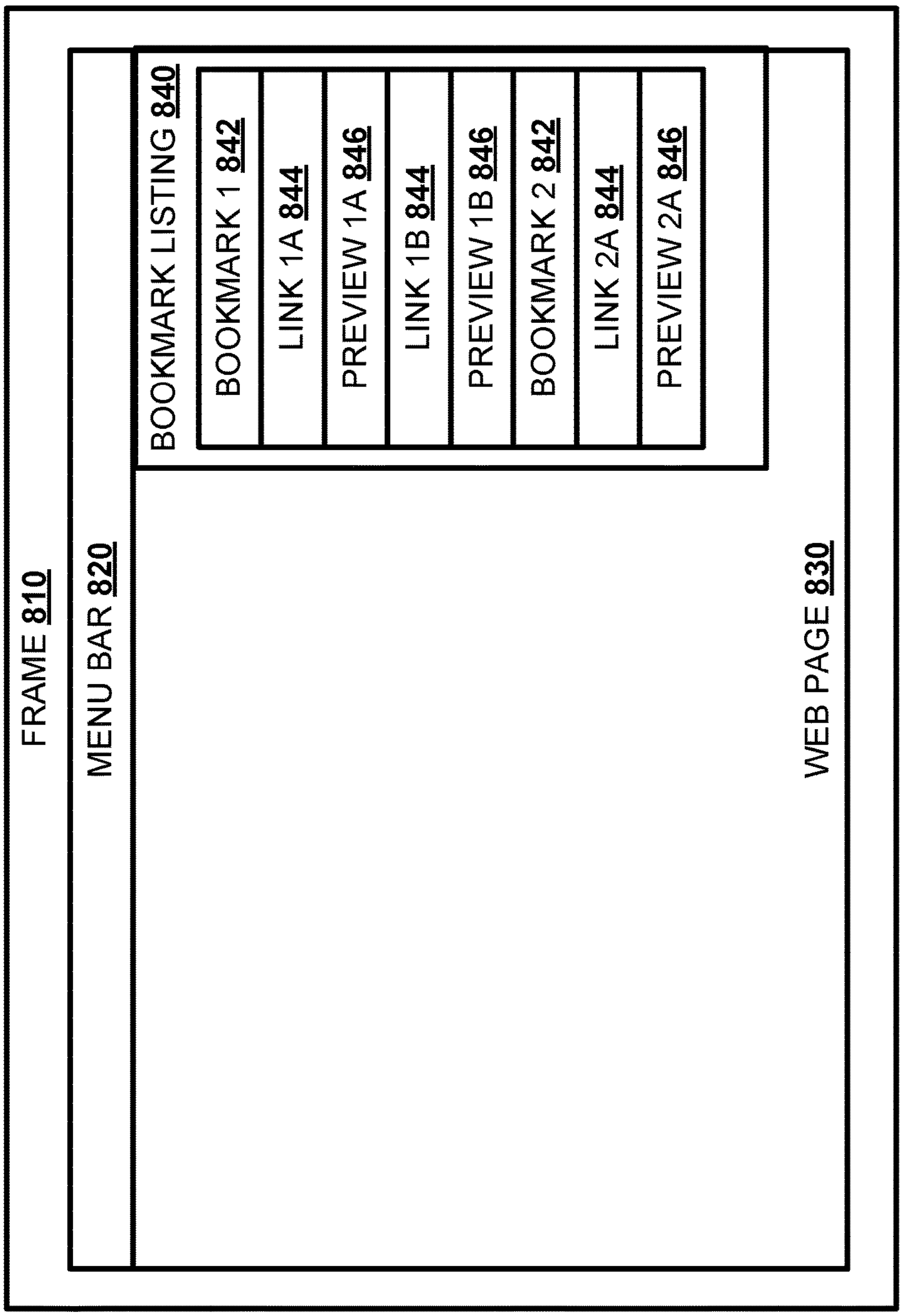
FIG. 8 illustrates, in a block diagram, one example of a user view of a bookmark listing.

FIG. 8 illustrates, in a block diagram, one example of a user view 800 of a bookmark listing. The browser may have a frame 810 containing the user interface. The frame 810 may have a menu bar 820 providing controls for operating the browser. The menu bar 820 may be hidden when not in use or may be present the entire time the browser is active. The browser may present a webpage 830 to a user.

The browser may have a bookmark listing 840 enumerating a list of one or more featured links acting as bookmarks 842 for a bookmarked website. The browser may identify a link 844 on the bookmarked website leading to a webpage frequently accessed by the user from the bookmarked website as a current site element acting as a current focus for the user. The browser may present the link 844 as an element representation to the user in the bookmark listing 840 with the bookmark 842. The browser may generate a content preview 846 for the webpage represented by the link 844. The browser may present the content preview 846 with the link 844 in the bookmark listing 840 to the user.

Alternately, the user may identify a set of updateable content on the bookmarked website as a historical focus, either explicitly or by playing if media. The browser may identify the updateable content as a current hub element. The browser may generate a content preview 846 to act as the element representation. The browser may present the content preview 846 to the user in the bookmark listing 840 with the bookmark 842.

Figure 9:
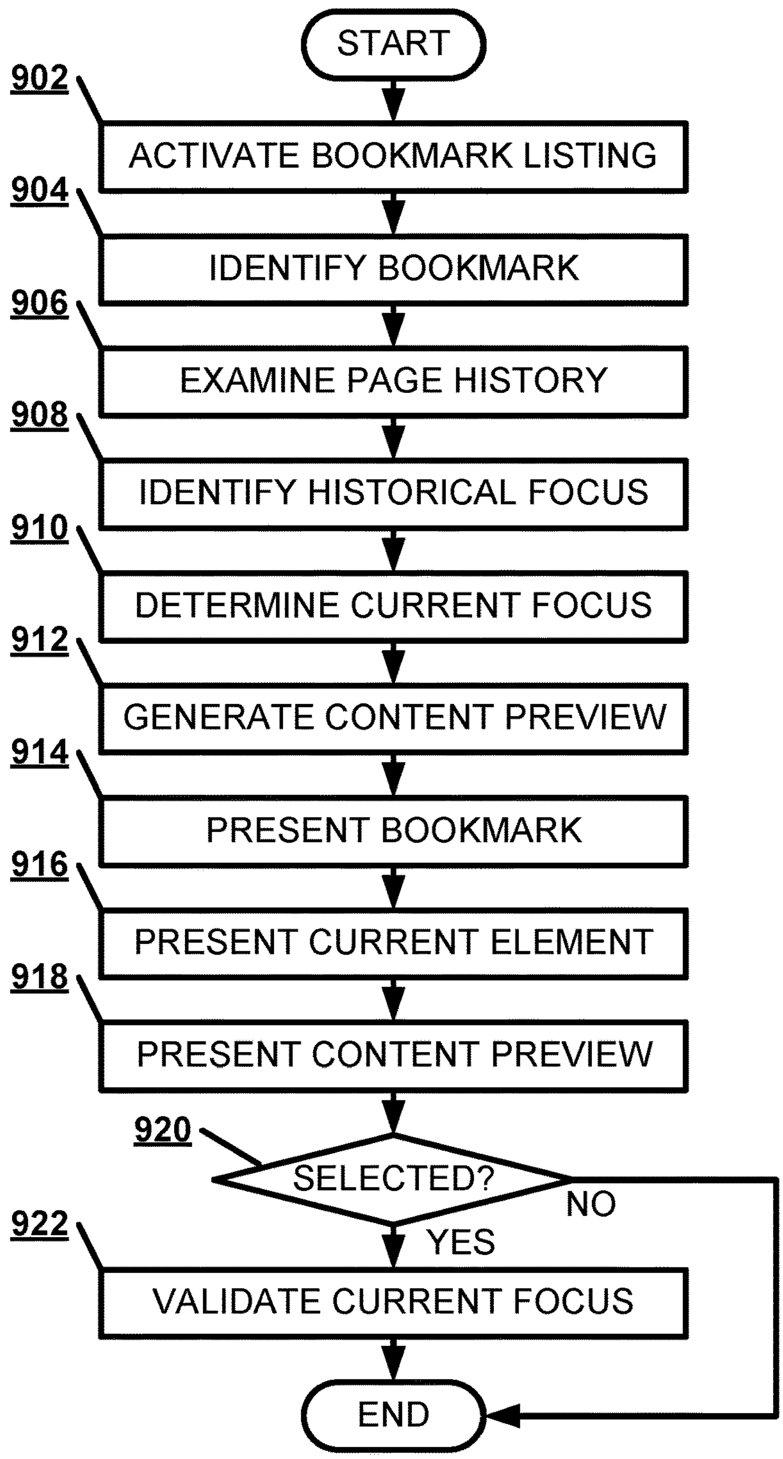
FIG. 9 illustrates, in a flowchart, one example of a method for presenting a bookmark listing.

FIG. 9 illustrates, in a flowchart, one example of a method 900 for presenting a bookmark listing. A browser implemented by a computing device, such as a user device, may activate a bookmark listing upon a user input (Block 902). The browser may identify a bookmarked website for the user for the bookmark listing (Block 904). The browser may examine a page history profile describing interactions with the bookmarked website (Block 906). The browser may identify a historical focus describing a historical site element of the bookmarked website (Block 908). The browser may determine a current site element acting as a current focus specific for a user based on the historical focus (Block 910). The browser may generate a content preview of the current site element (Block 912). The browser may present a featured link for the bookmarked website in a bookmark listing (Block 914). The browser may present an element representation of the current site element in a bookmark listing (Block 916). The browser may present the content preview of the current site element in a bookmark listing (Block 918). If the browser receives a selection of the element representation acting as a user indication the current site element is the current focus (Block 920), the browser may validate that the current focus determination was correct and weight future decisions accordingly (Block 922).

FIG. 10 illustrates, in a block diagram, one example of a hub record 1000. The hub record 1000 may have a website identifier (ID) 1010 identifying the website the hub record tracks. The hub record 1000 may have a user identifier 1020 identifying the user interacting with the website. The hub record 1000 may have a device identifier 1030 identifying the computing device the user implements to interact with the web site. The hub record 1000 may have a hub hit count 1040 tracking the number of accesses of the website by the user. The hub hit count 1040 may be a total count or a count over a set period of time, with older hits being removed as they exceed the set period.

The hub record 1000 may track multiple metrics used to identify a historical focus to determine a current focus of the user. For example, the hub record 1000 may have a selected element identifier field 1050. The selected element identifier field 1050 may identify a hub element that the user has specifically indicated is a focus of the user, such as right-clicking and marking in a drop down menu. The hub record 1000 may also have an implied element identifier field 1052. The implied element identifier field 1052 may identify a hub element that a user has focused on without specifically indicating that the hub element is a focus. For example, the hub element may be a text the user has highlighted or media content the user has played. A browser may prioritize a selected element over an implied element when determining a historic focus.

The hub record 1000 may have a spoke path identifier 1060 identifying the link path between a featured hub and a webpage. The spoke path identifier 1060 may have a spoke hit count 1062 tracking the number of accesses of the webpage via that link path by the user. The spoke path identifier 1060 may have a frequency field 1064 describing the frequency that the user accesses the link path over a set period of time. The spoke path identifier 1060 may have a recent timestamp field 1066 identifying the timestamp of the last access of the link path.

The hub record 1000 may have a category (CAT) tag 1070 identifying the category of hub elements the user accesses. The category tag 1070 may be a category type tag describing the type of hub elements, such as news, sports, politics, or scheduling. The category tag 1070 may be a category format tag describing the format of hub elements, such as text, media, or link. The category tag 1070 may have a tag hit count 1072 tracking the number of accesses of the hub elements in that category. The category tag 1070 may have a frequency field 1074 describing the frequency that the user accesses that category of hub element over a set period of time. The spoke path identifier 1060 may have a recent timestamp field 1066 identifying the timestamp of the last access of a hub element of that category.

Figure 11:
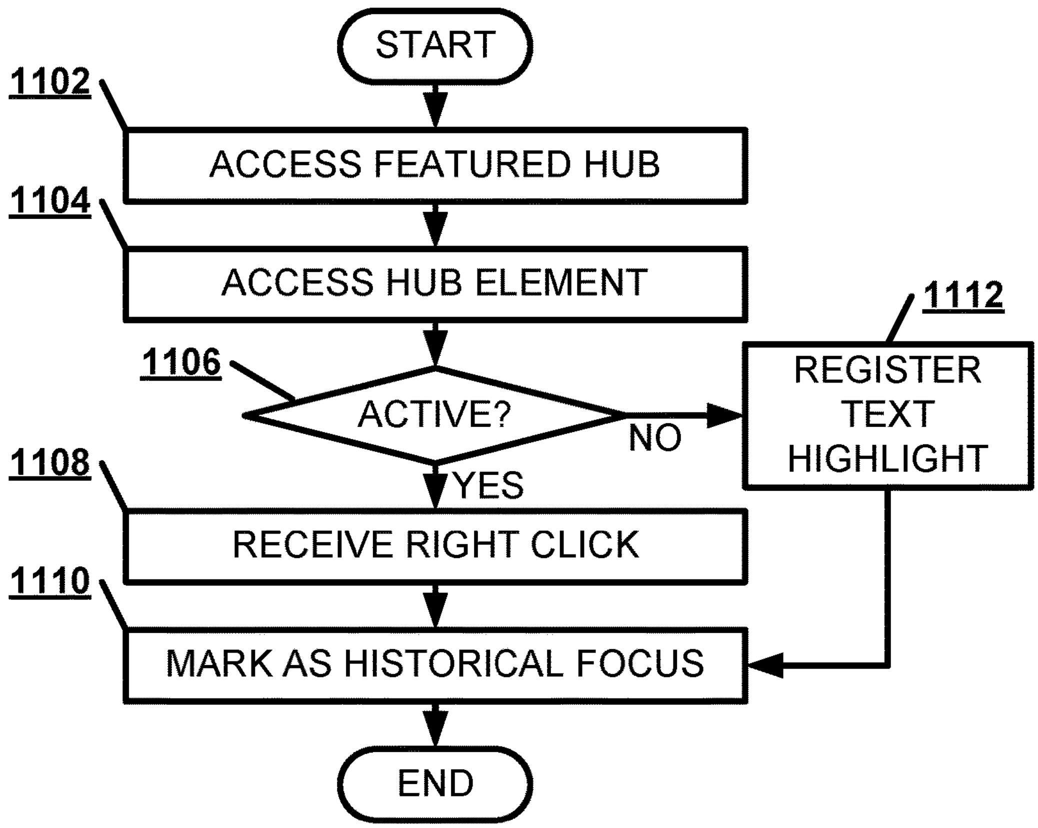
FIG. 11 illustrates, in a flowchart, one example of a method for identifying a current focus based on a user input.

The browser may have multiple processes for using these metrics to track a historical focus. FIG. 11 illustrates, in a flowchart, one example of a method 1100 for tracking a historical focus based on a user input. A browser implemented by a computing device, such as a user device, may access a featured hub (Block 1102). The browser may access a hub element at the input of the user (Block 1104). If the hub element is an active element, such as a link or media (Block 1106), the browser may receive a right click from the user as indicating the hub element is a historical focus (Block 1108). The browser may mark the active hub element as a historical focus for purposes of tracking (Block 1110). If the hub element is a passive element, such as text (Block 1106), the browser may register a highlight of a text element from the user as indicating the hub element is a historical focus (Block 1112). The browser may mark the passive hub element as a historical focus for purposes of tracking (Block 1110). When seeking the current focus of a featured hub, the browser may use the historic focus as the current focus.

Figure 12:
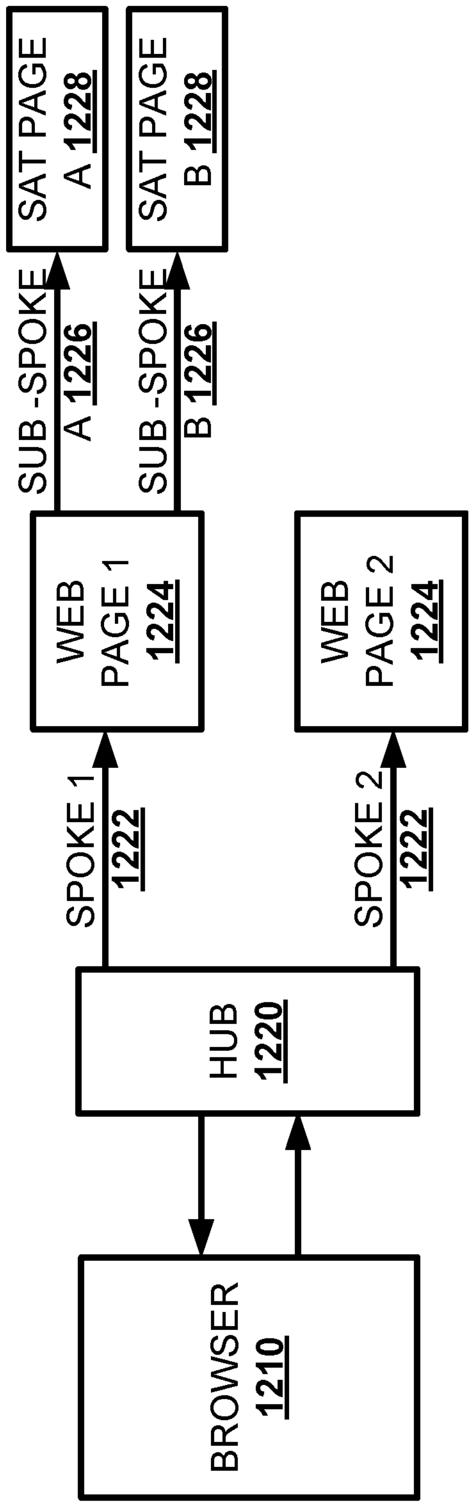
FIG. 12 illustrates, in a block diagram, one example of a hub-spoke structure.

FIG. 12 illustrates, in a block diagram, one example of a hub-spoke structure 1200. A browser 1210 may access a featured hub 1220 of content via a data network connection. The featured hub 1220 may have one or more spoke paths 1222 connecting to webpages 1224 housed under the domain of the featured hub 1220. For example, Web Page 1 1224 may be cnn.com/sports and Web Page 2 1224 may be cnn.com/elections, both housed under the domain of the featured hub 1220 of cnn.com. The spoke path 1222 for Web Page 1 1224 may be a link to sports on cnn.com. Similarly, the spoke path 1222 for Web Page 2 1224 may be a link to elections on cnn.com. Further, a webpage 1224 may act as a hub with a set of sub-spoke paths 1226 to a set of satellite webpages 1228. In the above example, Satellite Page A may be cnn.com/sports/Boston and Satellite Page B may be cnn.com/sports/Chicago, both linked to Web Page 1 1224 being cnn.com/sports. The sub-spoke path 1226 for Satellite Page A may be a link to Boston on cnn.com/sports. Similarly, the sub-spoke path 1226 for Satellite Page B may be a link to Chicago on cnn.com/sports. While the content on the webpages 1224 may change, the spoke path 1222 and sub-spoke path 1226 to get to the satellite webpages 1228 may stay the same. The browser 1210 may use the spoke path 1222 and sub-spoke path 1226 to identify a historic focus of the user. The browser 1210 may then use that historic focus to suggest a link or other content that may act as a current focus to the user, deprioritizing other content and links determined to be less likely of concern to the user.

Figure 13:
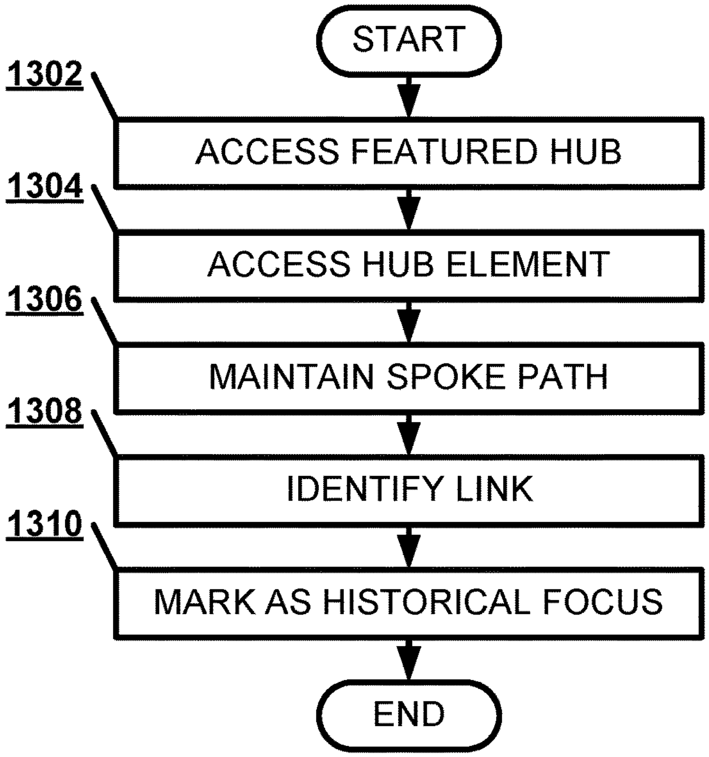
FIG. 13 illustrates, in a flowchart, one example of a method for identifying a current focus based on a hub-spoke relationship.

FIG. 13 illustrates, in a flowchart, one example of a method 1300 for tracking a historical focus based on a hub-spoke relationship. A browser implemented by a computing device, such as a user device, may access a featured hub (Block 1302). The browser may access a hub element, such as a webpage, connected to the hub at the input of the user (Block 1304). The browser may maintain a spoke path relation between the featured hub and a webpage connected to the featured hub (Block 1306). The browser may identify a link as the historical focus based on a spoke path relation between the featured hub and the link (Block 1308). The browser may mark the link as a historical focus for purposes of tracking (Block 1310). When seeking the current focus of a featured hub, the browser may use the historic focus as the current focus.

Figure 14:
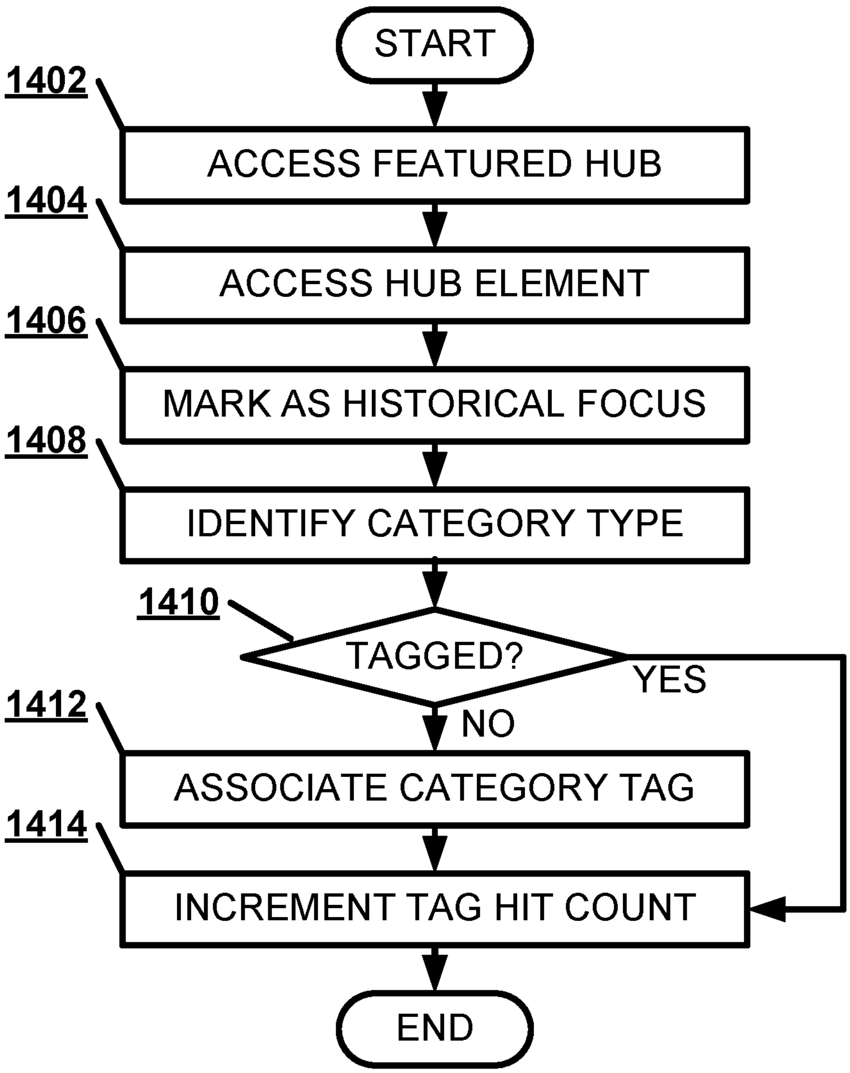
FIG. 14 illustrates, in a flowchart, one example of a method for identifying a historical focus based on category tagging.

FIG. 14 illustrates, in a flowchart, one example of a method 1400 for identifying a historical focus based on category tagging. A browser implemented by a computing device, such as a user device, may access a featured hub (Block 1402). The browser may access a hub element at the input of the user (Block 1404). The browser may mark the hub element as a historical focus for purposes of tracking (Block 1406). The browser may identify a category type for the historical focus (Block 1408). If the featured hub does not already have a category type tag for the category type (Block 1410), the browser may associate a category type tag with the featured hub describing the historical focus (Block 1412). The browser may increment a tag hit count for the category type tag for the featured hub (Block 1414).

Figure 15:
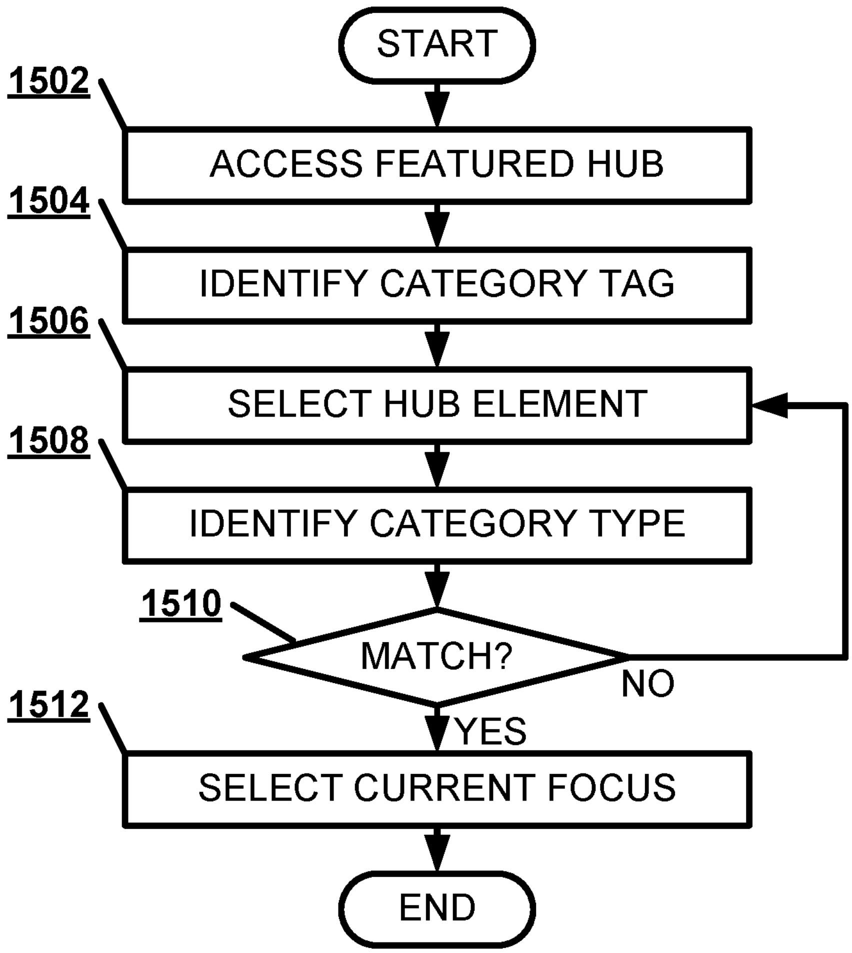
FIG. 15 illustrates, in a flowchart, one example of a method for identifying a current focus based on category tagging.

FIG. 15 illustrates, in a flowchart, one example of a method 1500 for identifying a current focus based on category tagging. A browser implemented by a computing device, such as a user device, may access a featured hub (Block 1502). The browser may identify a category type tag for the featured hub having the highest tag hit count (Block 1504). The browser may select a hub element of the featured hub (Block 1506). The browser may identify a category type for the hub element (Block 1508). If the category type for the hub element matches the category type tag (Block 1510), the browser may select a current focus for the featured hub based on a category type for the historical focus (Block 1512). Otherwise, the browser may select the next hub element of the feature hub for examination (Block 1506).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Examples may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

I claim:

1. A user device, comprising:

memory configured to store a page history profile describing interactions with a featured hub of content, the featured hub of content providing access to content from a plurality of webpages and one or more spoke path relations between the plurality of webpages and a plurality of links;

a processing core having at least one processor configured to:

identify the featured hub of content in a browser;

identify with the browser a historical focus describing a historical hub element of the featured hub;

determine a current hub element acting as a current focus specific for a user based on the historical focus; and a display screen configured to;

present a featured link to the featured hub in a new tab page; and present an element representation of the current hub element.

2. The user device of claim 1, wherein the memory is further configured to track a device-page history profile describing interactions between multiple users on the user device and the featured hub.

3. The user device of claim 1, wherein the memory is further configured to maintain a user-page history profile describing interactions between the user and the featured hub.

4. The user device of claim 1, further comprising:

a communication interface configured to receive a user-page history profile describing interactions between the user and the featured hub from a network account.

5. The user device of claim 1, wherein the display screen is further configured to present the featured link for the featured hub in a bookmark listing.

6. The user device of claim 1, wherein the processing core is further configured to identify at least one of a bookmarked website and a frequently visited website as the featured hub.

7. The user device of claim 1, wherein the memory is further configured to maintain a spoke path relation between the featured hub and a webpage connected to the featured hub.

8. The user device of claim 1, wherein the processing core is further configured to identify a link as the historical focus based on a spoke path relation between the featured hub and the link.

9. The user device of claim 1, wherein the processing core is further configured to identify a category type for the historical focus.

10. The user device of claim 1, wherein the memory is further configured to associate a category type tag with the featured hub describing a category type for the historical focus.

11. The user device of claim 1, wherein the processing core is further configured to select the current focus for the featured hub based on a category type for the historical focus.

12. The user device of claim 1, wherein the processing core is further configured to generate a content preview of the current hub element.

13. The user device of claim 1, further comprising:

a user input device configured to receive a user indication that the current hub element is the current focus.

14. The user device of claim 1, further comprising:

a user input device configured to register a highlight of a text element as indicating the historical focus.

15. A non-transitory computer-readable medium storing computer code executable by a processor, comprising:

code for identifying a featured hub of content in a browser, the featured hub of content providing access to content from a plurality of webpages and one or more spoke path relations between the plurality of webpages and a plurality of links;

code for examining at the browser a page history profile describing interactions with the featured hub;

code for identifying with the browser a historical focus describing a historical hub element of the featured hub;

code for determining a current hub element acting as a current focus specific for a user of the computing device based on the historical focus;

code for presenting a featured link to the featured hub in a new tab page; and code for presenting an element representation of the current hub element.

16. The computer-readable medium of claim 15, further comprising:

code for receiving a user-page history profile describing interactions between the user and the featured hub from a network account.

17. The computer-readable medium of claim 15, further comprising:

code for maintaining a spoke path relation between the featured hub and a webpage connected to the featured hub.

18. The computer-readable medium of claim 15, further comprising:

code for identifying a link as the historical focus based on a spoke path relation between the featured hub and the link.

19. A machine-implemented method, comprising:

identifying a bookmarked website in a browser implemented by a user device, the bookmarked website corresponding to a featured hub of content providing access to content from a plurality of webpages and one or more spoke path relations between the plurality of webpages and a plurality of links;

examining at the browser a page history profile describing interactions with the bookmarked website;

identifying with the browser a historical focus describing a historical site element of the bookmarked website;

determining a current site element acting as a current focus specific for a user of the user device based on the historical focus;

presenting a featured link for the bookmarked web site in a bookmark listing; and presenting an element representation of the current site element.

20. The method of claim 19, further comprising:

maintaining a spoke path relation between the bookmarked website and a webpage connected to the bookmarked website; and identifying a link as the historical focus based on the spoke path relation between the bookmarked website and the link.

* * * * *